UNITED STATES PATENT OFFICE.

JOHN H. PEMBERTON, OF BROOKLYN, NEW YORK.

BINDING COMPOSITION FOR FIBROUS MATERIALS.

SPECIFICATION forming part of Reissued Letters Patent No. 10,520, dated September 9, 1884.

Original No. 302,023, dated July 15, 1884. Application for reissue filed August 13, 1884.

*To all whom it may concern:*

Be it known that I, JOHN H. PEMBERTON, a citizen of the United States, and a resident of Brooklyn, in the county of Kings, State of New York, have invented certain new and useful Improvements in Binding Compositions for Fibrous Materials, of which the following is a specification.

This invention relates to the manufacture of yarns from fibrous material having little adhesive qualities—as asbestus—and has for its object to provide a means for causing the fibers of the asbestus, &c., to adhere together, so as to make a strong yarn; without the admixture therewith of any substance detrimental to the purpose to which said yarns are to be applied.

It consists in thoroughly mixing with the asbestus, after it has been cleaned of all dirt, grit, &c., and carded, a binding material composed of pure lard-oil, water, borax, and starch, the proportions of which may be varied according to the qualities of the asbestus used.

I have obtained good results with asbestus of fair quality by mixing therewith a binding material composed of these ingredients in the following proportions, viz: ten gallons of lard-oil, twenty-five gallons of water, two pounds of borax, and three pounds of starch, the water being preferably heated to cause a thorough combination and admixture of the ingredients. The asbestus, after the first carding process, is spread out in thin layers, and the above composition sprinkled over it, using about one and a half gallon thereof to each one hundred pounds of asbestus. It is then allowed to stand some time to become nearly dry, or may be quickly dried, if desired, on any suitable drying apparatus. Then it is passed through a willowing-machine and again carded before being submitted to the finishing and condensing processes to make it into yarn. This second carding operation is sufficient with my process to bring the asbestus into proper condition for the finishing and condensing operations, whereas in the method of making such yarns as at present practiced, where a fibrous material of an adhesive nature is mixed with the asbestus, several condensing operations are necessary to cause a perfect admixture of the two different qualities of fiber.

By the use of my composition the cards work clean with the asbestus, and the starch also preserves the white appearance of the asbestus. The oil and other ingredients, if used alone, would give the yarn a dark color. It also has the effect of preserving the cards, acting somewhat as a lubricant to keep them pliable, they being quickly destroyed when used to card the asbestus alone or asbestus mixed with fibrous binding material.

Other advantages resulting from the use of my composition are that less waste occurs in the carding process by reason of the greater tendency of all the fibers to adhere together during such process, a much stronger yarn is produced therefrom than from a mixture of fibrous material with the asbestus, and the peculiar properties of the asbestus are not thereby impaired.

The formation of the carded asbestus into yarn is not here described, as it forms no part of my invention.

This composition is also adapted to be used with other fibrous material than asbestus as a binding material, it being particularly adapted to bind together short-staple fibers which have little or no natural adhering quality.

Having now described my invention, what I claim, and desire to secure by Letters Patent, is—

1. As a binding composition for fibrous materials, the following ingredients, combined in about the proportions named, viz: ten gallons of lard-oil, twenty-five gallons of water, two pounds of borax, and three pounds of starch, substantially as described.

2. As an improvement in the manufacture of asbestus yarn, the combination, with the carded asbestus, of a binding material composed of lard-oil, water, borax, and starch, in about the proportions specified.

3. As an article of manufacture, asbestus yarn having as a binding material a composition of lard-oil, water, borax, and starch, in about the proportions specified.

In testimony whereof I have hereunto set my hand, at New York, county and State of New York, this 9th day of August, A. D. 1884.

JOHN H. PEMBERTON.

Witnesses:

ALFRED SHEDLOCK,
CHAS. L. WATSON.